Patented Jan. 15, 1952

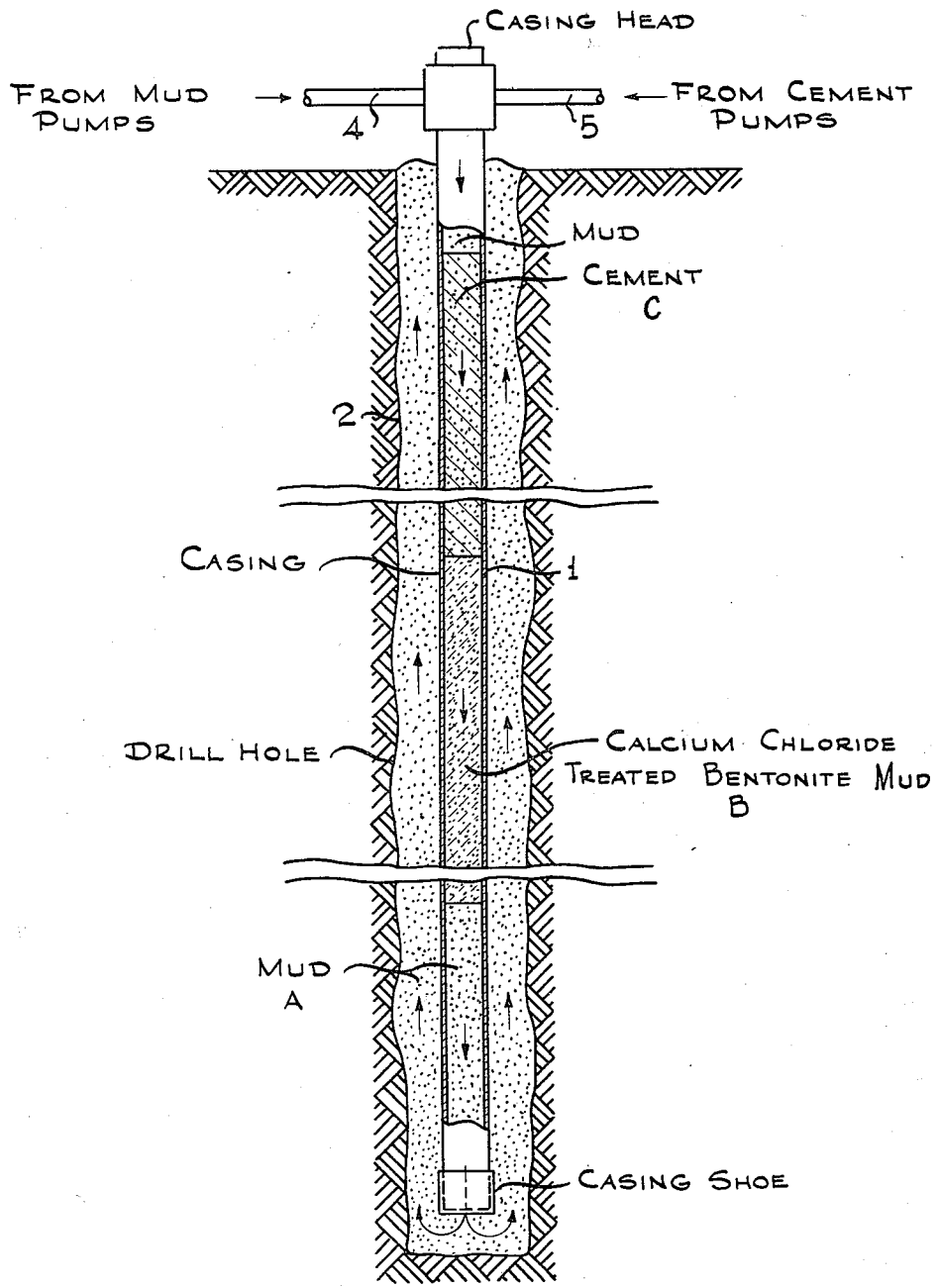
Lawton L. Laurence  Inventor

2,582,909

UNITED STATES PATENT OFFICE

2,582,909

PREPARATION AND USE OF FLUID PLUGS IN OIL WELL CEMENTING

Lawton L. Laurence, Kansas City, Mo., assignor to Standard Oil Development Company, a corporation of Delaware Application September 6, 1947, Serial No. 772,487

1 Claim. (Cl. 166—22)

The present invention is concerned with an improved process for the recovery of petroleum crude oil. The invention is more particularly directed to a method and technique of cementing wells in which drilling muds are employed. In accordance with the present process a portion of the drilling mud is pretreated in order to inhibit it against an excessive increase in viscosity when this mud is contacted with cement for the purpose of sealing certain sections of the well.

It is well known in the art to employ various types of drilling muds in drilling wells for the recovery of crude oils from the ground. These muds are used primarily to remove the cuttings from the bottom of the bore hole by circulating the mud from the surface to the tool bit and back again to the surface. The muds vary considerably and generally are especially prepared with respect to viscosity, jelling effects, and the like. For example, a clay widely used as a drilling mud comprises a bentonitic clay which is mixed with water in various concentrations. Upon completion of the well, or at certain depths throughout the preparation of the bore hole, a procedure employed is to seal off or protect the oil-rich sand by cementation. The procedure generally employed is to circulate to the desired position in the well a quantity of cement which will set in a period of from about 12 to 50 hours.

However, one difficulty encountered in this cementation process is that the calcium present in the cement reacts with the portion of clay slurry with which it is in contact to greatly increase the viscosity of this clay slurry. As a matter of fact, in many instances the reaction is so intense that actual jelling of the clay in immediate contact with the cement results. Various explanations of this phenomenon have been given. One explanation is that the calcium replaces the hydrogen of the clay to form a calcium complex which, as heretofore pointed out, results in a great increase in viscosity and in many instances actual jelling of the clay. This marked increase in the viscosity of the clay in many instances results in channeling and voids occurring in the cementation operation. Thus, a faulty cementation job results which does not prevent the flow of undesirable fluids into the oil-rich areas.

I have now discovered a process which will substantially overcome this problem. In accordance with my process I especially prepare a portion of clay which will be in contact with the cement during the setting period. My pretreating process of this selected quantity of clay comprises a partial and controlled replacement of the hydrogen of the bentonite with a metal such as calcium. It is my belief that by partially controlling this reaction, this clay upon contact with the calcium of the cement will be substantially completely inhibited against further reaction, thus, avoiding a resulting ill effect.

My pretreatment of the clay which is to be in contact with the cement during the setting period comprises treating the clay with a soluble metallic salt which is characterized by being highly ionizable. Soluble salts for example which are satisfactory, are salts of the alkaline earth metals, the alkali metals and salts of metals of Group II of the periodic table. In general, the salts of potassium, magnesium, zinc, barium, copper, aluminum, iron and tin are satisfactory. The particular salts of these metals which may be used may be the chlorides, sulphates, or other soluble ionizable salts.

The pretreated clay may be prepared by any satisfactory procedure. However, in general the preferred procedure is to utilize the dry powder and add it to an aqueous solution, for example a solution of calcium chloride. In general, it is desirable that the concentration of the calcium chloride in the aqueous solution be in the range from .05 to 0.5%. The dry clay is added to the calcium chloride aqueous solution so as to secure a mud slurry having a viscosity substantially equivalent to the viscosity of the drilling mud used in the drilling operations.

A particularly desirable test method which may be employed in order to determine whether or not an excessive amount of calcium or equivalent has been added to the prepared mud is to mix the prepared inhibited mud with a quantity of the standard drilling mud. If an increase in viscosity is noted, the concentration of calcium chloride or equivalent inhibitor should be decreased in the prepared inhibited drilling mud slurry.

The process of my invention may be more readily understood by reference to the drawing illustrating one embodiment of the same. Referring specifically to the drawing, casing 1 is placed in bore hole 2. Under normal operation, mud is introduced into the casing from mud pumps by means of conduit 4. The mud passes downwardly within the casing, enters the bottom of the hole and passes upwardly between the outside of the casing and the bore hole wall.

Upon completion of the hole, it is desirable to seal off various sections of the hole in order to prevent the flow of undesirable fluids into the oil-producing sand. This cementation process is accomplished by introducing a portion of cement from cement pumps through conduit 5 into the casing. The operation is continued, the cement being circulated down to its desired location between quantities of drilling mud. When the cement has reached the section of the hole it is desired to cement, circulation is discontinued for a period sufficient to allow the cement to set.

As pointed out heretofore, when muds ordinarily employed in oil well drilling operations become contaminated with cement during the oil well cementation operation, a very high viscosity mud is formed. In many instances the viscosity of the cement-contaminated mud is sufficiently high to cause channeling of the cement which results in a faulty cementation job and thus does not prevent the flow of undesirable fluids into the oil-rich areas. In accordance with my process, I place a volume of inhibited mud between the standard mud and the quantity of cement which is to be employed in the cementation operation. The standard mud volume in the drawing is illustrated as (A). The inhibited mud, which for the purpose of illustration is assumed to be a plug of calcium chloride treated bentonite mud, is shown as (B). The cement is illustrated by (C). The circulation is continued until the cement reaches the desired section in the bore hole, at which time circulation is discontinued. Thus, while the cement is setting it is in contact with an inhibited mud the viscosity of which will not increase and thus will not cause the cement to channel.

The process of my invention will be more readily understood by the following examples illustrating the same.

*Example 1*

A standard 6.3% bentonite clay drilling mud was prepared. This drilling mud was contacted with a 50% aqueous slurry of cement at a temperature of 20° C. The Stormer [1] viscosity of the drilling mud before and after contact with about 2% of cement was as follows:

| | Viscosity [2] |
|---|---|
| Drilling mud | 100 |
| Drilling mud +2% cement slurry | 1600 |

[2] Driving Weight Gr. 600 R. P. M. Stormer.

From the above it is apparent that the viscosity of the drilling mud increased vastly upon contact of the drilling mud with an aqueous slurry of cement.

*Example 2*

An inhibited drilling mud in accordance with

[1] See API Code No. 29, second edition, July 1942, page 6. "Standard Field Procedure for Testing Drilling Fluids."

my invention was prepared as follows. Dry bentonite clay was added to aqueous solution containing .1% calcium-chloride. Sufficient clay was added to secure approximately a 5% clay slurry. When this inhibited mud was mixed with from 2 to 50% of cement no increase in viscosity of the mud was noted.

My invention generally comprises the preparation of an inhibited mud which will be in contact with the cement during the setting of the same. Although I do not wish to be limited with respect to theory, it is my belief that the process combines a partial and controlled reaction of the clay prior to introducing the clay to contact with the cement. This pretreatment may be carried out with any suitable highly ionizable metal salt. An especially desirable pretreatment comprises preparing a calcium chloride solution followed by adding thereto a sufficient quantity of bentonite clay to secure the desired drilling mud. The concentration of the drilling mud may vary quite widely.

The process of my invention is not to be limited by any theory as to mode of operation, but only in and by the following claim.

What is claimed is:

In a process for the cementing of areas in a cased oil well in the presence of a bentonite type drilling mud wherein a quantity of cement is circulated down through the casing to a selected area and circulation is stopped until the cement has set, the improvement which comprises circulating to said selected area immediately ahead of said quantity of cement a quantity of an inhibited bentonite drilliig mud prepared by dispersing, in an aqueous solution containing from about 0.05 to about 0.5% of a soluble ionizable salt of a metal of Group II of the periodic table, sufficient bentonite to form a 5 to 6.3% slurry.

LAWTON L. LAURENCE.

REFERENCES CITED

The following references are of record in the file of this patent:

UNITED STATES PATENTS

| Number | Name | Date |
|---|---|---|
| 1,460,788 | Carman | July 3, 1923 |
| 2,171,840 | Armentrout et al. | Sept. 5, 1939 |
| 2,304,256 | Huebel | Dec. 8, 1942 |
| 2,398,347 | Anderson | Apr. 16, 1946 |
| 2,433,668 | Jones | Dec. 30, 1947 |

OTHER REFERENCES

"A Review of Recent Advances in Drilling-Mud Control" by P. E. Chaney—The Oil Weekly—November 23, 1942, p. 32, p. 32, lines 40–65.